(12) United States Patent
Churchill

(10) Patent No.: US 12,455,812 B2
(45) Date of Patent: Oct. 28, 2025

(54) AUTOMATED CONVERSION BETWEEN BEHAVIORAL TESTS AND INTEGRATION TESTS FOR SOFTWARE TESTING

(71) Applicant: Raytheon Company, Waltham, MA (US)

(72) Inventor: Benjamin Christopher Churchill, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 196 days.

(21) Appl. No.: 18/501,599

(22) Filed: Nov. 3, 2023

(65) Prior Publication Data

US 2025/0147867 A1 May 8, 2025

(51) Int. Cl.
*G06F 9/44* (2018.01)
*G06F 11/3668* (2025.01)

(52) U.S. Cl.
CPC ...... *G06F 11/3688* (2013.01); *G06F 11/3684* (2013.01); *G06F 11/3696* (2013.01)

(58) Field of Classification Search
CPC ............. G06F 11/3688; G06F 11/3684; G06F 11/3696
See application file for complete search history.

(56) References Cited

U.S. PATENT DOCUMENTS

| | | | |
|---|---|---|---|
| 9,135,147 B2 | 9/2015 | Artzi et al. | |
| 10,289,535 B2 * | 5/2019 | Yadav | G06F 11/3688 |
| 10,361,944 B2 | 7/2019 | Chavda et al. | |
| 10,437,712 B1 | 10/2019 | Tyler et al. | |
| 10,713,365 B2 | 7/2020 | Biswas et al. | |
| 10,838,848 B2 | 11/2020 | Fong | |
| 11,354,226 B2 * | 6/2022 | Allweil | G06F 11/3688 |
| 2023/0359746 A1 * | 11/2023 | Wang | G06F 11/3688 |
| 2024/0256428 A1 * | 8/2024 | Huang | G06F 11/3636 |

OTHER PUBLICATIONS

International Search Report and Written Opinion of the International Searching Authority dated Feb. 12, 2025 in connection with International Patent Application No. PCT/US2024/054400, 9 pages.
Pactflow, "[Introduction to contract testing—Part 2] Contract testing and how Pact works", YouTube Video, Mar. 2021, 2 pages.
Pactflow, "[Introduction to contract testing—Part 3] Demo—Contract testing with Pact JS", YouTube Video, Mar. 2021, 2 pages.

* cited by examiner

*Primary Examiner* — Qamrun Nahar

(57) ABSTRACT

A method includes performing one or more behavioral tests of software code. The method also includes, during the one or more behavioral tests, recording interactions associated with the software code. The interactions include simulated incoming interactions to the software code and actual outgoing interactions from the software code. The method further includes converting the interactions into contracts, where each contract includes information defining how at least one interaction involving the software code occurs. In addition, the method includes generating one or more integration tests for the software code based on the contracts. The one or more behavioral tests are configured to test functional behaviors of the software code. The one or more integration tests are configured to test integration of the software code with at least one external component.

20 Claims, 9 Drawing Sheets

AUTOMATED CONVERSION BETWEEN BEHAVIORAL TESTS AND INTEGRATION TESTS FOR SOFTWARE TESTING

TECHNICAL FIELD

This disclosure is generally directed to software testing systems and methods. More specifically, this disclosure is directed to the automated conversion between behavioral tests and integration tests for software testing.

BACKGROUND

New software can undergo various types of testing in order to validate the software, such as behavioral testing and integration testing. Behavioral testing typically involves testing the functional behavior of the software itself in isolation, such as by testing whether the software correctly performs the functions that the software is expected to perform. Integration testing typically involves testing the interactions of the software with one or more external components, such as by testing whether the software interacts with other software in an expected manner.

SUMMARY

This disclosure relates to the automated conversion between behavioral tests and integration tests for software testing.

In a first embodiment, a method includes performing one or more behavioral tests of software code. The method also includes, during the one or more behavioral tests, recording interactions associated with the software code. The interactions include simulated incoming interactions to the software code and actual outgoing interactions from the software code. The method further includes converting the interactions into contracts, where each contract includes information defining how at least one interaction involving the software code occurs. In addition, the method includes generating one or more integration tests for the software code based on the contracts. The one or more behavioral tests are configured to test functional behaviors of the software code. The one or more integration tests are configured to test integration of the software code with at least one external component.

In a second embodiment, an apparatus includes at least one processing device configured to perform one or more behavioral tests of software code. The at least one processing device is also configured, during the one or more behavioral tests, to record interactions associated with the software code. The interactions include simulated incoming interactions to the software code and actual outgoing interactions from the software code. The at least one processing device is further configured to convert the interactions into contracts, where each contract includes information defining how at least one interaction involving the software code occurs. In addition, the at least one processing device is configured to generate one or more integration tests for the software code based on the contracts. The one or more behavioral tests are configured to test functional behaviors of the software code. The one or more integration tests are configured to test integration of the software code with at least one external component.

In a third embodiment, a non-transitory machine readable medium contains instructions that when executed cause at least one processor to perform one or more behavioral tests of software code. The non-transitory machine readable medium also contains instructions that when executed cause the at least one processor, during the one or more behavioral tests, to record interactions associated with the software code. The interactions include simulated incoming interactions to the software code and actual outgoing interactions from the software code. The non-transitory machine readable medium further contains instructions that when executed cause the at least one processor to convert the interactions into contracts, where each contract includes information defining how at least one interaction involving the software code occurs. In addition, the non-transitory machine readable medium contains instructions that when executed cause the at least one processor to generate one or more integration tests for the software code based on the contracts. The one or more behavioral tests are configured to test functional behaviors of the software code. The one or more integration tests are configured to test integration of the software code with at least one external component.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
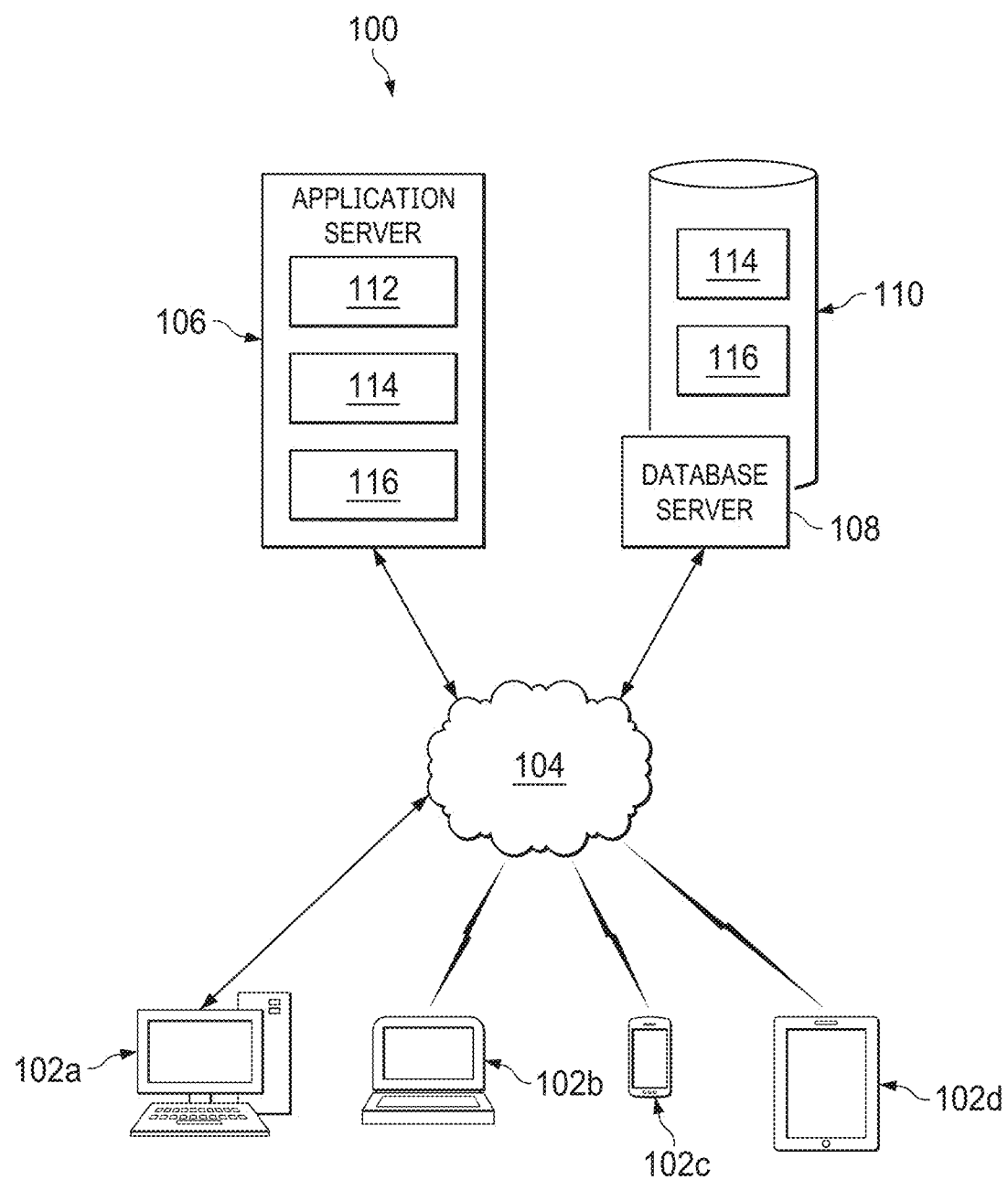
FIG. 1 illustrates an example system supporting automated conversion between behavioral tests and integration tests for software testing according to this disclosure.

FIGS. 1 through 8B, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, new software can undergo various types of testing in order to validate the software, such as behavioral testing and integration testing. Behavioral testing typically involves testing the functional behavior of the software itself in isolation, such as by testing whether the software correctly performs the functions that the software is expected to perform. Integration testing typically involves testing the interactions of the software with one or more external components, such as by testing whether the software interacts with other software in an expected manner.

In some cases, behavioral testing can include unit tests, component tests, and other functional tests, while integration testing can include contract tests, end-to-end tests, and other integration tests. Behavioral testing and integration testing are often separate in efforts, technologies, and philosophies. In many cases, one of these types of testing is performed, while the other type of testing is ignored. For example, only integration testing may be used for verifying both behavior and integration, or only behavioral testing may be employed. However, behavioral testing is often poor at verifying integrations, and integration testing is often poor at verifying functional behaviors. Using only integration testing can result in an insufficient, non-scalable, and unmaintainable test portfolio, while using only behavioral testing can ignore integrations completely.

The costs of fixing errors in software greatly increase after software code has left the hands of its developers. In other words, it may be necessary or desirable for there to be sufficient automated testing in order to identify errors before the software code leaves the hands of the developers and is deployed for use or for integration into larger systems. Thus, using both behavioral testing and integration testing can be beneficial if this helps identify errors earlier. However, sufficient testing often involves large amounts of effort, so sufficient testing is often skipped, resulting in more-expensive errors. Even if both behavioral testing and integration testing are used, there are often significant duplicated efforts involved. Among other things, this can be due to the fact that it is typically not possible to fully isolate software's functional behaviors from its integrations (or vice versa).

This disclosure provides various techniques for automated conversion between behavioral tests and integration tests for software testing. As described in more detail below, this disclosure provides a testing pattern or process that supports the automated conversion of one type of automated software test into another type of automated software test. For instance, a behavioral test for software can be automatically converted into an integration test for software. Each type of test usually has one focus or philosophy, so converting the focus or philosophy of one type of software test into the focus or philosophy of another type of software test automatically is generally non-trivial. This can be particularly true since automated tests are typically hand-written code created to exercise specific parts of a codebase in specific ways. Moreover, "test doubles" can be created and used to form the integration tests, such as when a test double that can be used to replay the same or similar interactions that occurred during one or more behavioral tests is packaged with a corresponding set of contracts defining the interactions expected to occur using the software. Behavioral testing often exercises and verifies the behavior of software code while simulating or mocking external integrations. The described techniques effectively allow the behavioral tests to be converted into integration tests, which opens the door for significant benefits to development teams. Among other things, this may be used to convert a suite of functional tests into one or more test doubles for software development teams.

In this way, it is possible to more quickly and easily create both behavioral tests and integration tests for software, which reduces the amount of effort and cost needed to perform more thorough testing of the software. For example, the number of tests that may be generated by developers might be cut in half, such as when the developers create the behavioral tests and the disclosed techniques are used to convert the behavioral tests into integration tests. As a result, software testing can become more predictable, risks involving the software can be reduced, and higher-quality software can be produced more efficiently. This can also help to decrease the likelihood of end users discovering bugs in code, enable better code reuse across systems, and decrease risks when integrating systems. Moreover, improved testing of software can help to identify problems within or affecting the software sooner, which can enable corrections to be made to the software faster and at less cost. Further, the described techniques are easily scalable and can be used to create and maintain economic, practical, and scalable test suites. In addition, the described techniques can be used to bridge the gap between behavioral and integration testing philosophies, enabling both testing philosophies to be supported but without constraining developers to validating both behaviors and integrations at the same time.

Note that the techniques described in this patent document may find use in various settings and with software designed for any number of applications. For example, the described techniques may be used in software "factories" where software is developed for a number of use cases. The described techniques may be used when hardware devices include multiple circuit boards or other components that communicate with one another, such as to test and validate each circuit board or other component individually before integrating the circuit boards or other components into a combined system. The software that is tested can be used in any number of devices or systems, such as from embedded software to web development. The described techniques may be used to create high-quality subscription-based libraries of software for other developers or to create high-quality open-source code. The described techniques may be used by individual users or organizations for internal use, such as by developers supporting continuous integration/continuous delivery (CI/CD) of software, or provided by cloud platforms. However, these examples are for illustration and explanation only. In general, the techniques described in this disclosure may be used for testing any suitable software in any suitable setting or environment.

FIG. 1 illustrates an example system 100 supporting automated conversion between behavioral tests and integration tests for software testing according to this disclosure. As shown in FIG. 1, the system 100 includes multiple user devices 102a-102d, at least one network 104, at least one application server 106, and at least one database server 108 associated with at least one database 110. Note, however, that other combinations and arrangements of components may also be used here.

In this example, each user device 102a-102d is coupled to or communicates over the network 104. Communications between each user device 102a-102d and a network 104 may occur in any suitable manner, such as via a wired or wireless connection. Each user device 102a-102d represents any suitable device or system used by at least one user to interact with the application server 106 or database server 108, such as to receive information from the application server 106 or database server 108. Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate communication protocol or protocols.

The application server 106 is coupled to the network 104 and is coupled to or otherwise communicates with the database server 108. The application server 106 supports various functions related to the testing of software, such as software written by one or more users of the user devices 102a-102d. For example, the application server 106 may execute one or more applications 112 related to software development. At least one of the applications 112 may support a testing pattern or process that performs automated conversion of one type of automated software test into another type of automated software test, such as by converting behavioral tests 114 for software automatically into integration tests 116 for the software. The behavioral tests 114 and integration tests 116 may be stored in the database 110 or used by the application server 106, such as to actually perform tests of software. Example functions of the application(s) 112 related to the automated conversion of software tests are provided below.

The database server 108 operates to store and facilitate retrieval of various information used, generated, or collected by the application server 106 and the user devices 102a-102d in the database 110. For example, the database server 108 may store various information in relational database tables or other data structures in the database 110. In some cases, the database server 108 may store the behavioral tests 114 and artifacts, packages, or other collections of test doubles and contracts defining the integration tests 116 in the database 110. The stored tests can be retrieved from the database 110 and used by various developers or other users or by the application server 106. Note that the database server 108 may also be used within the application server 106 to store information, in which case the application server 106 may store the information itself.

Although FIG. 1 illustrates one example of a system 100 supporting automated conversion between behavioral tests and integration tests for software testing, various changes may be made to FIG. 1. For example, the system 100 may include any number of user devices 102a-102d, networks 104, application servers 106, database servers 108, databases 110, applications 112, behavioral tests 114, and integration tests 116. Also, these components may be located in any suitable locations and might be distributed over a large area. In addition, while FIG. 1 illustrates one example operational environment in which automated conversion between behavioral tests 114 and integration tests 116 for software testing may be used, this functionality may be used in any other suitable system.

Figure 2:
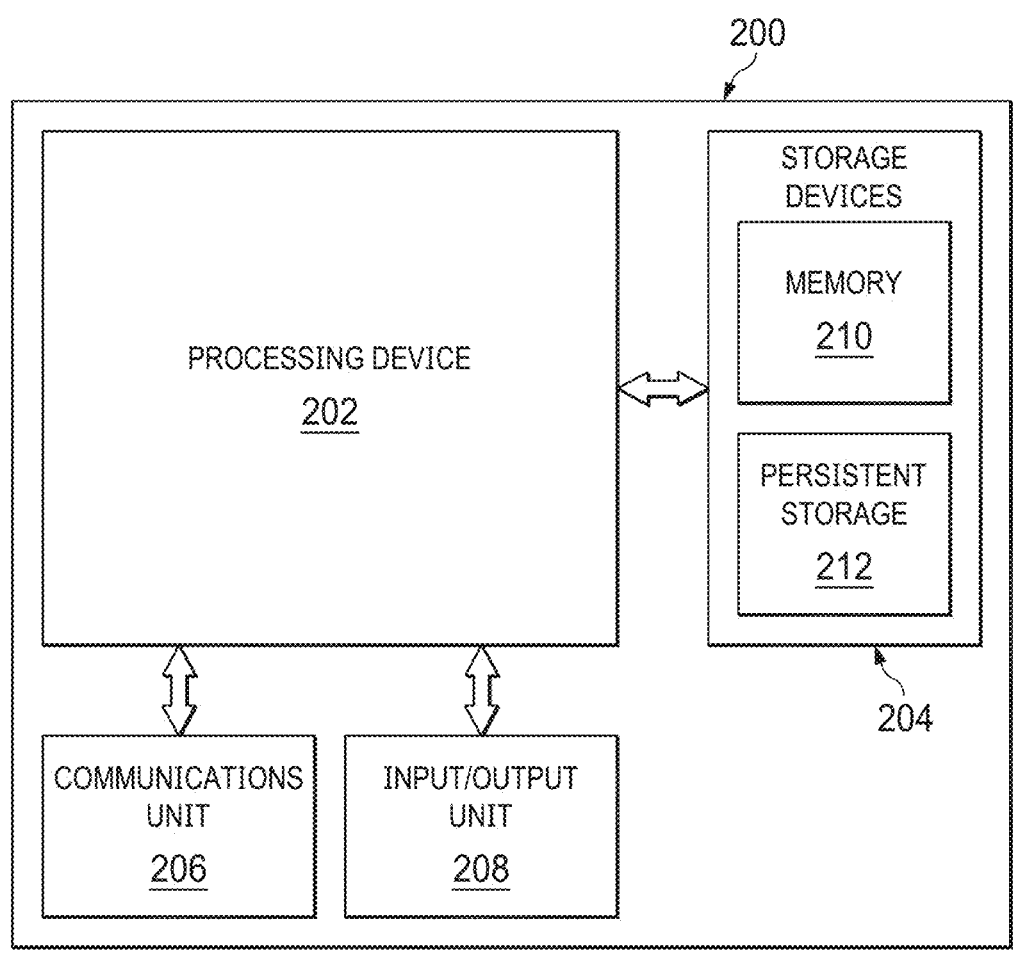
FIG. 2 illustrates an example device supporting automated conversion between behavioral tests and integration tests for software testing according to this disclosure.

FIG. 2 illustrates an example device 200 supporting automated conversion between behavioral tests and integration tests for software testing according to this disclosure. One or more instances of the device 200 may, for example, be used to at least partially implement the functionality of the application server 106 of FIG. 1. However, the functionality of the application server 106 may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s). As a particular example, the communications unit 206 may support communication over the network(s) 104 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement the functionality of the application(s) 112 for performing automated conversion between behavioral tests 114 and integration tests 116 for software testing. Thus, for example, the instructions when executed by the processing device 202 may cause the device 200 to obtain one or more behavioral tests 114 and perform various operations described below to generate one or more associated integration tests 116 based on the behavioral test(s) 114. The behavioral test(s) 114 and integration test(s) 116 may be used in any suitable manner, such as when the behavioral test(s) 114 and the integration test(s) 116 are stored and used to test software code or one or more components that may interact with the software code.

Although FIG. 2 illustrates one example of a device 200 supporting automated conversion between behavioral tests and integration tests for software testing, various changes may be made to FIG. 2. For example, computing and communication devices and systems come in a wide variety of configurations, and FIG. 2 does not limit this disclosure to any particular computing or communication device or system.

Figure 3:
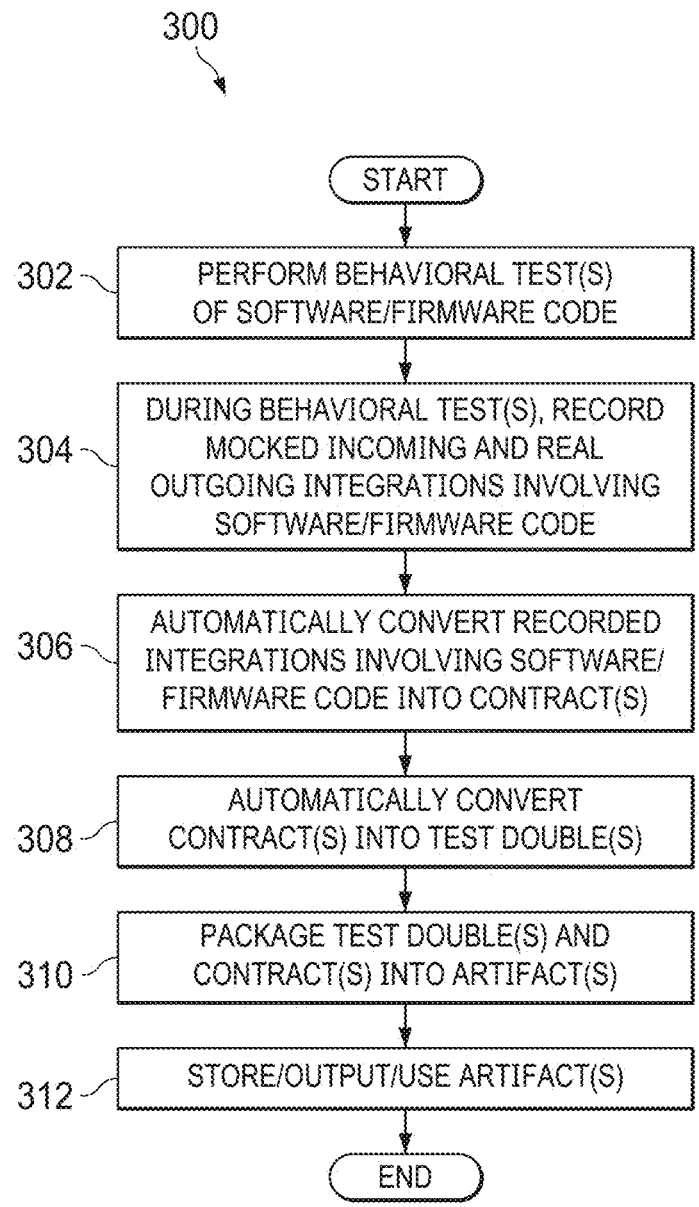
FIG. 3 illustrates an example method for automated conversion between behavioral tests and integration tests for software testing according to this disclosure.

FIG. 3 illustrates an example method 300 for automated conversion between behavioral tests and integration tests for software testing according to this disclosure. FIGS. 4 through 7 illustrate example operations during automated conversion between behavioral tests and integration tests for software testing according to this disclosure. More specifically, FIGS. 4 through 7 provide examples of what may occur during various steps in the method 300 of FIG. 3. For ease of explanation, the method 300 and its operations are described as being performed using the application server 106 in the system 100 shown in FIG. 1, where the application server 106 may be implemented using one or more instances of the device 200 shown in FIG. 2. However, the method 300 and its operations may be used with any other suitable device(s) and in any other suitable system(s).

As shown in FIG. 3, one or more behavioral tests of software code are performed at step 302. This may include, for example, the processing device(s) 202 of the application server 106 executing one or more behavioral tests 114 to test the functional behavior(s) of software code under test. Often times, the one or more behavioral tests 114 are created manually, such as by one or more developers using one or more user devices 102a-102d to generate code for the one or more behavioral tests 114. Of course, nothing prevents the one or more behavioral tests 114 from being generated by an automated tool or produced in any other suitable manner. In many instances, the one or more behavioral tests 114 are intended to test more important or interesting behaviors of the software code under test. During the one or more behavioral tests 114, one or more external components that would typically interact with the software code under test are mocked or simulated, such as by simulating incoming integrations like hypertext transfer protocol (HTTP) requests or asynchronous messages. This allows the one or more behavioral tests 114 to test the software's behavior in complete isolation.

Figure 4:
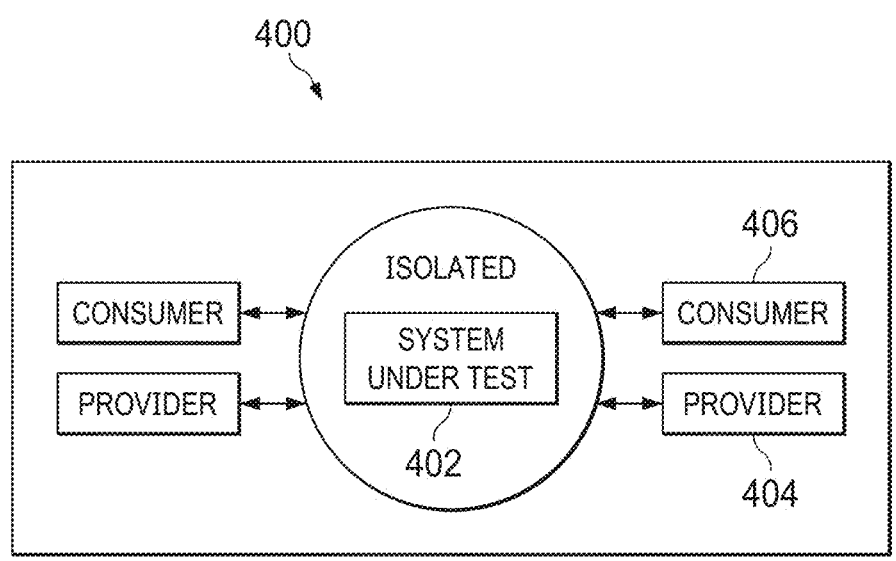
FIGS. 4 through 7 illustrate example operations during automated conversion between behavioral tests and integration tests for software testing according to this disclosure.

One example of this operation is shown in FIG. 4, where a behavioral testing process 400 involves a system under test 402 that represents the software code being tested. As shown here, the system under test 402 is isolated from one or more providers 404 and/or one or more consumers 406. Each provider 404 represents an external component that can provide services via HTTP responses, asynchronous messages, or other data to the system under test 402 during the one or more behavioral tests 114. Each consumer 406 represents an external component that can receive services via HTTP requests, asynchronous messages, or other data from the system under test 402 during the one or more behavioral tests 114. Each provider 404 and consumer 406 represents any suitable external component that can interact with a system under test 402 during testing, such as an external hardware component (like a circuit board, circuit card assembly, processing device, or other hardware) or other software code. Note that while the one or more providers 404 and the one or more consumers 406 are shown separately here, this is merely for ease of illustration and explanation. The same external component may simultaneously represent a provider 404 and a consumer 406. Also note that the system under test 402 can be viewed as a consumer itself (when it receives data from one or more providers 404) and/or as a provider itself (when it provides data to one or more consumers 406).

During the performance of the behavioral test(s) 114, mocked incoming and real outgoing integrations involving the software code are recorded at step 304. This may include, for example, the processing device(s) 202 of the application server 106 using one or more "spy" proxies to record interactions involving the simulated external component(s) associated with the one or more behavioral tests 114. As particular examples, the one or more spy proxies may record HTTP requests, asynchronous messages, or other data provided to the system under test 402 during the one or more behavioral tests 114 by the one or more simulated providers 404. The one or more spy proxies may also record HTTP responses, asynchronous messages, or other data provided from the system under test 402 during the one or more behavioral tests 114 to the one or more simulated consumers 406. As a result, the one or more spy proxies can record simulated incoming interactions or integrations and actual outgoing interactions or integrations associated with the software code under test. Among other things, this can result in a record of one or more concrete transactions between the software code under test and one or more external components. Note that because the one or more behavioral tests 114 often involve important or interesting behaviors of the software code under test, the record of transactions can hold valuable information for dependent systems, such as the consumer(s) 406.

Figure 5:
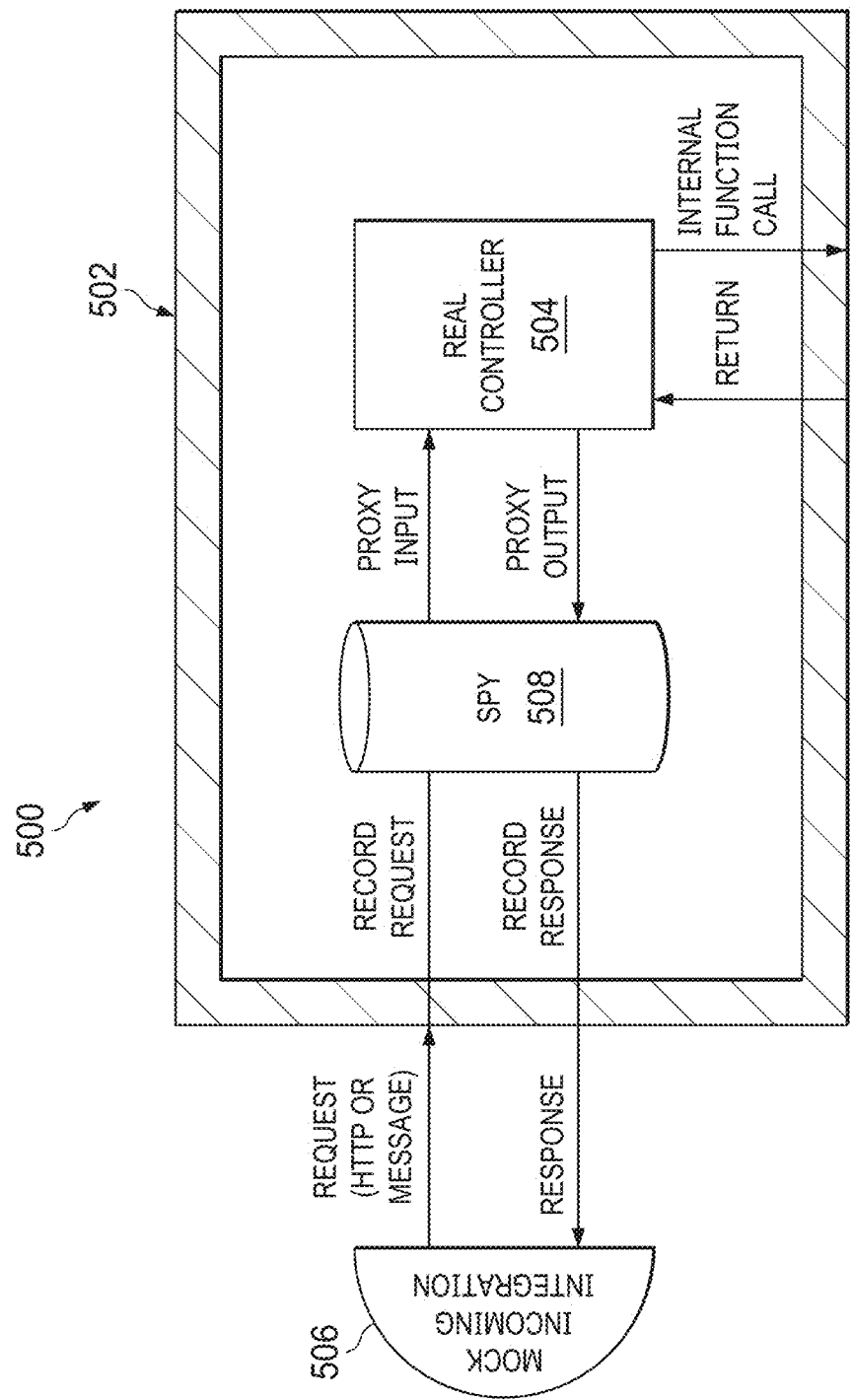

One example of this operation is shown in FIG. 5, where a transaction recordation process 500 involves the use of an I/O controller proxy 502. The controller proxy 502 here is associated with an actual or real controller 504, which may be implemented by or in association with the system under test 402. The controller 504 is used to interact with at least one mocked integration 506, each of which can represent a mocked or simulated external component that can interact with the system under test 402 during the one or more behavioral tests 114. Here, each mocked integration 506 can provide one or more HTTP requests, asynchronous messages, or other data to the system under test 402 during the one or more behavioral tests 114. Based on that, the controller 504 can perform one or more internal function calls to invoke one or more functions of the software under test and obtain return results from the one or more functions. The return results can be used by the controller 504 to provide one or more HTTP responses, asynchronous messages, or other data from the system under test 402 during the one or more behavioral tests 114. In addition, at least one spy 508 can be logically positioned between the controller 504 and the at least one mocked integration 506. Each spy 508 can represent code or other logic that captures the interactions between the controller 504 and at least one mocked integration 506. For instance, the spy 508 can record HTTP requests, asynchronous messages, or other data from the mocked integration 506 and forward the HTTP requests, asynchronous messages, or other data to the controller 504 for use. The spy 508 can also record HTTP responses, asynchronous messages, or other data from the controller 504 and forward the HTTP responses, asynchronous messages, or other data to the mocked integration 506.

The recorded integrations involving the software code under test are automatically converted into one or more contracts at step 306. This may include, for example, the processing device(s) 202 of the application server 106 using the data recorded by one or more spies 508 in order to produce one or more contracts. In this document, the term "contract" refers to information defining how a transaction or other interaction occurs between a data provider and a data consumer (one of which is the system under test 402). Among other things, a contract defines how to make a request and what to expect in response to that request. The system under test 402 may be associated with any number of contracts based on its interactions and may possibly be associated with a large number of contracts.

Figure 6:
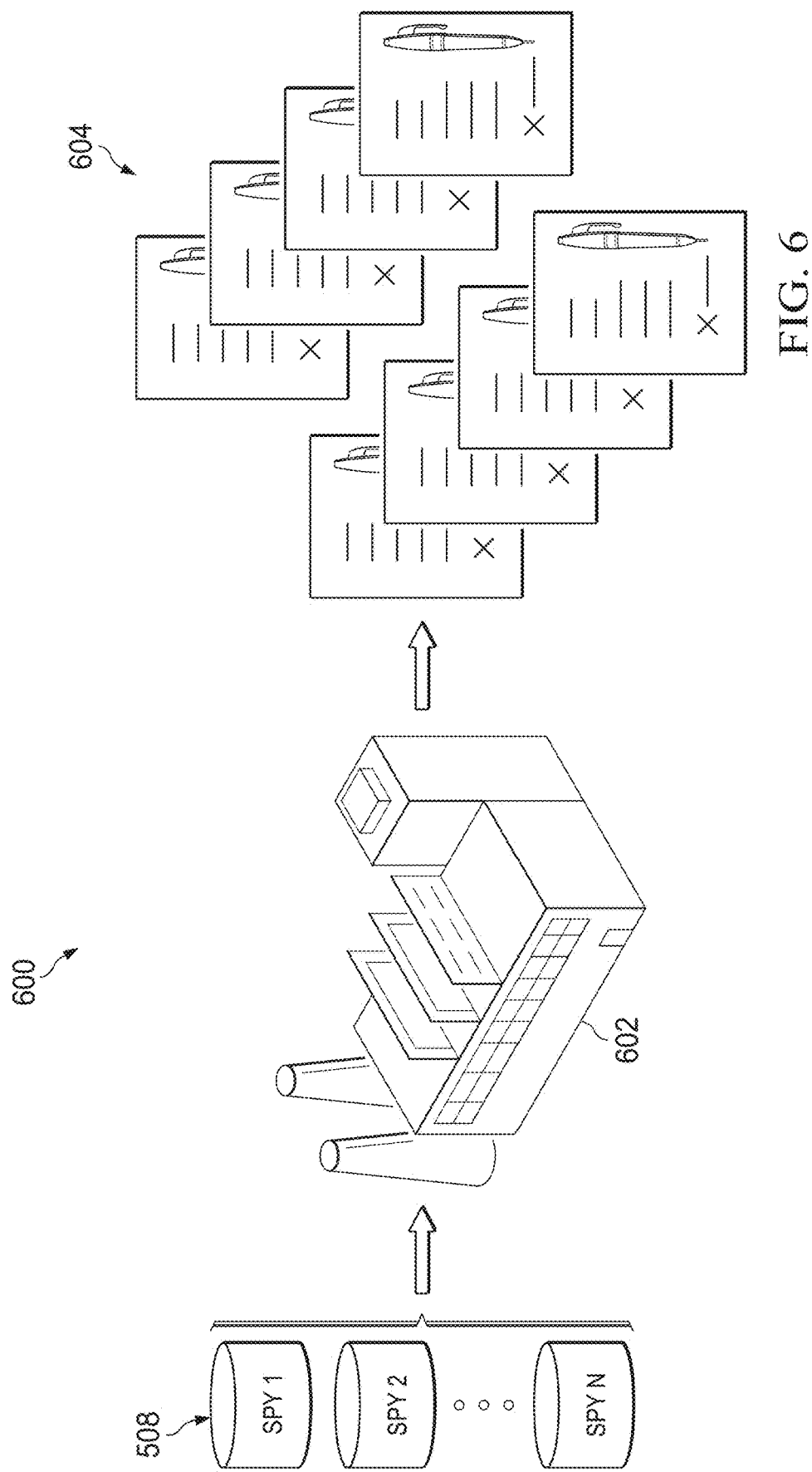

One example of this operation is shown in FIG. 6, where a contract generation process 600 involves obtaining transaction-related information from one or more spies 508. As described above, each spy 508 may be used to capture interactions between the system under test 402 and at least one mocked integration 506, such as actual outgoing information and simulated incoming information associated with the mocked integration 506. Here, the information from the spy or spies 508 is provided to a contract generation function 602, which processes the information in order to generate one or more contracts 604 associated with the system under test 402. Note that because each contract 604 is generated based on a behavioral test 114 that is successfully performed, it is known that the system under test 402 already complies with that contract 604. As a result, designers of one or more external components that interact with the system under test 402 can have confidence that the one or more external components can be integrated with the system under test 402 based on the contract(s) 604.

Note that the actual data recorded for each contract 604 can depend (among other things) on the application layer protocol or protocols being utilized by the system under test 402. For example, in some embodiments, an implementer or designer can determine what data to include in each of the contracts 604. As noted above, each contract 604 includes information defining how a transaction or other interaction occurs between a data provider and a data consumer, including information on how to make a request and what to expect in response. As a particular example, a contract 604 for an HTTP transaction may include the following contents:
- HTTP request method (such as GET, PUT, POST, PATCH, or DELETE);
- HTTP request uniform resource locator (URL);
- HTTP request header(s);
- HTTP request query parameter(s);
- HTTP request body;
- HTTP response status;
- HTTP response header(s); and
- HTTP response body.

The format of each contract 604 may depend on the tool used to implement or perform the contract generation function 602. For example, different libraries may have different specifications for contract formats. As particular examples, the SPRING Cloud Contract tool supports .JSON and .YAML files with named key/value pairs, while the PACT FOUNDATION contract tool supports JSON files but with different key/value pairs. Regardless of what format is employed, each contract 604 may be human-readable so that developers can clearly understand the transactions associated with the system under test 402. Note that if the system under test 402 is used within a framework (such as a SPRING, FLASK, ASP.NET, or other framework), the tool used to implement or perform the contract generation function 602 may integrate within the framework.

In terms of determining which contracts 604 to generate, there are various approaches for identifying contracts 604 of interest. For example, one approach can be provider-driven, where the developers of the system under test 402 decide what contracts 604 are to be generated and used. In this case, developers of the system under test 402 may make assumptions on what behaviors are of interest to one or more consumers 406 based on their working knowledge of the consumers' needs. Another approach can be consumer-driven, where developers of the system under test 402 collaborate with developers of one or more consumers 406 on what specific behaviors the consumers 406 need.

While it can be useful or important to consider what contracts 604 are to be generated, it can also be necessary or desirable to still create behavioral tests 114 to support development and protect against regression. Although consumers 406 may not need all contracts 604 generated from all behavioral tests 114, one example purpose of an automated test suite can be to support development. If contracts 604 are not needed for all behavioral tests 114, some embodiments may mark certain behavioral tests 114 to not be automatically converted into integration tests 116. While the described techniques offer a way to automatically generate one or more integration tests 116 per behavioral test 114, there can be situations in which not all behavioral tests 114 are converted into integration tests 116 or situations in which not all integration tests 116 need to be generated from behavioral tests 114.

Collectively, steps 304 and 306 of the method 300 can be used to convert meaningful behavioral tests 114 into meaningful contracts. Note here that the behavioral tests 114 need not be altered or consumed in order to generate the contracts. The one or more contracts are automatically converted into one or more test doubles at step 308. This may include, for example, the processing device(s) 202 of the application server 106 using the contract(s) 604 defined for the system under test 402 to generate one or more test doubles that can intelligently replay the transactions identified in the contract(s) 604 given the same or similar requests. In some embodiments, a test double represents an executable artifact or other executable code or file that can replay responses of the system under test 402 given similar requests, such as in order to mimic concrete transactions. As a result, each test double can behave similarly to the system under test 402. In particular embodiments, a test double can imitate the same behaviors (such as the same transactions) that were exercised during all of the behavioral tests 114 combined. In those embodiments, a single transaction that the test double is capable of performing may correspond to a single behavioral test 114.

The generation of the test doubles can be based (among other things) on the format and data of the contracts 604. Also, how the test doubles are meant to be executed can affect how the test doubles are generated. As particular examples, if the test doubles are meant to be executed in a JAVA-based automation tool such as JENKINS, it may make sense to generate the test doubles as executable .JAR files. If the test doubles need to be executable on a number of platforms, it may make sense to generate the test doubles using container images (such as DOCKER containers). Various technologies for creating test doubles from specifications exist, such as the WIREMOCK open-source software, which can be run as a standalone process, in test code, or deployed in a container.

In some embodiments, some form of pattern matching may be used to support more-intelligent generation of test doubles. For example, hard-coded data fields (such as dates) and hard-coded URL parameters (such as identifiers) can make test doubles cumbersome to work with if strict matching is used for response replays. Various implementations of pattern matching may be used here to generate the test doubles, such as regular expression (regex) pattern matching.

Each test double and its associated contract or contracts are packaged into an artifact at step 310. This may include, for example, the processing device(s) 202 of the application server 106 combining each test double and its associated contract(s) 604 into a logical data container. Each artifact can be stored, output, or used in some manner at step 312. This may include, for example, the processing device(s) 202 of the application server 106 storing each artifact in the database 110, using each artifact to test software code or one or more components that interact with the software code, or performing any other suitable function(s) using each artifact. In some embodiments, each artifact may be stored in the database 110 so that both developers of the system under test 402 and developers of any related provider(s) 404 or consumer(s) 406 can use one or more artifacts during testing. In particular embodiments, each artifact can be versioned so that different versions of the same artifact can be stored.

Figure 7:
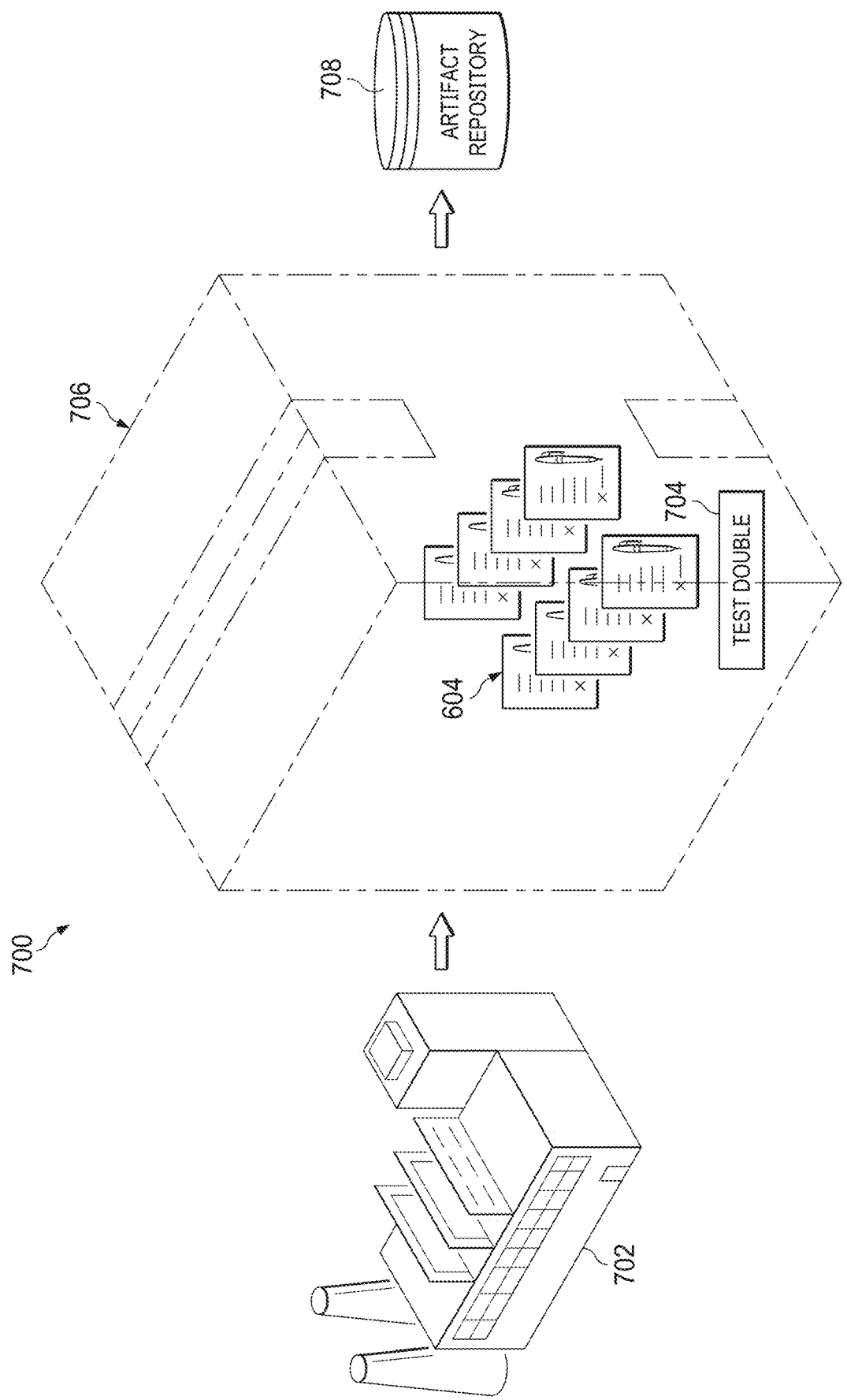

Examples of these operations are shown in FIG. 7, where an artifact process 700 uses a conversion function 702 to convert contracts 604 into one or more test doubles 704. Each test double 704 and its associated contract(s) 604 can be packaged into an artifact 706, and the artifact 706 can be stored in an artifact repository 708 (which may be included in or represent the database 110). Each artifact here can represent an integration test 116 that is derived based on execution of an associated behavioral test 114. At this point, the artifact 706 can be used in any suitable manner. For instance, the artifact 706 may be retrieved from the artifact repository 708, by itself or with other tests (such as one or more other integration tests 116 and/or one or more behavioral tests 114) and used for testing purposes. Note that the testing purposes here may relate to the same software code forming the system under test 402 or one or more other components, such as other software code or a hardware device that may be designed to interact with the system under test 402.

These techniques therefore provide a solution to various technical problems, such as difficulties creating and maintaining a scalable and effective suite of automated software tests in an economical manner. These techniques also enable multiple testing philosophies of software testing while significantly reducing or minimizing duplicated efforts and expected costs to fix errors in software code.

Although FIG. 3 illustrates one example of a method 300 for automated conversion between behavioral tests and integration tests for software testing and FIGS. 4 through 7 illustrate examples of operations during automated conversion between behavioral tests and integration tests for software testing, various changes may be made to FIGS. 3 through 7. For example, while shown as a series of steps, various steps in FIG. 3 may overlap, occur in parallel, occur in a different order, or occur any number of times. Also, each of the operations during automated conversion between behavioral tests and integration tests as shown in FIGS. 4 through 7 may be implemented in any other suitable manner.

It should be noted that the functions shown in or described with respect to FIGS. 3 through 7 can be implemented in a server or other electronic device(s) in any suitable manner. For example, in some embodiments, at least some of the functions shown in or described with respect to FIGS. 3 through 7 can be implemented or supported using one or more software applications 112 or other software instructions that are executed by the processing device(s) 202 of the application server 106 or other electronic device(s). In other embodiments, at least some of the functions shown in or described with respect to FIGS. 3 through 7 can be implemented or supported using dedicated hardware components. In general, the functions shown in or described with respect to FIGS. 3 through 7 can be performed using any suitable hardware or any suitable combination of hardware and software instructions. Also, the functions shown in or described with respect to FIGS. 3 through 7 can be performed by a single electronic device or by multiple electronic devices.

Figure 8A:
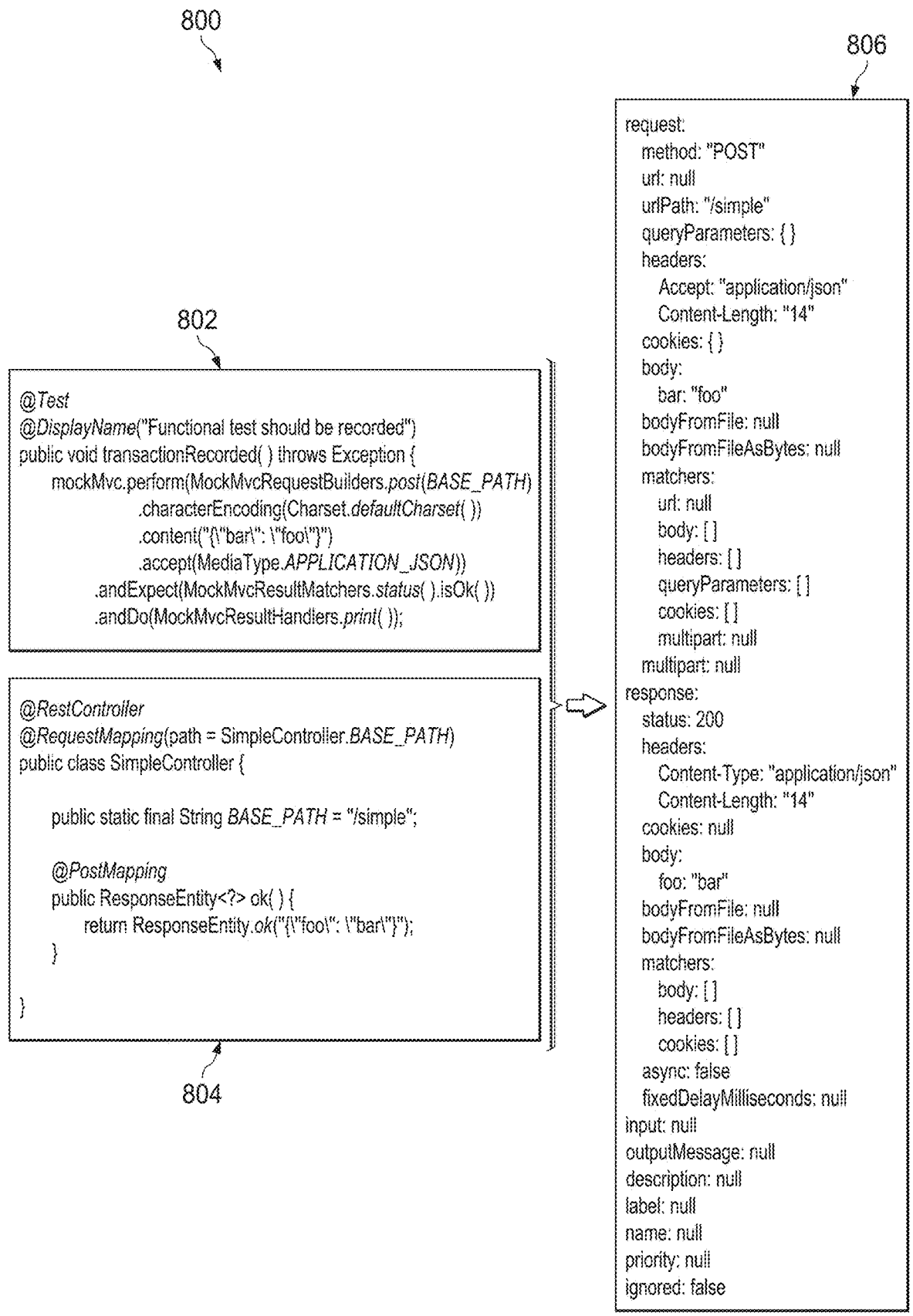
FIGS. 8A and 8B illustrate an example recording of interactions and generation of contracts during conversion between behavioral tests and integration tests for software testing according to this disclosure.
Figure 8B:
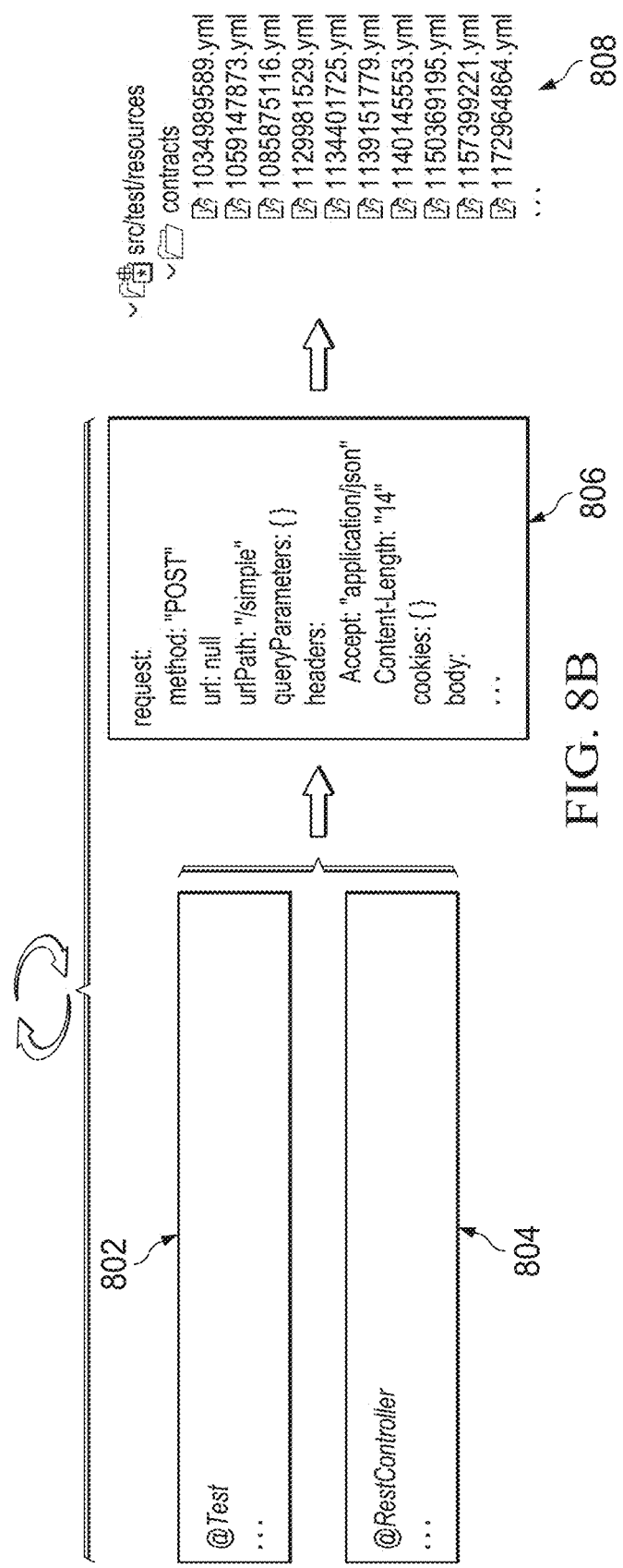

FIGS. 8A and 8B illustrate an example recording of interactions and generation of contracts during conversion between behavioral tests and integration tests for software testing according to this disclosure. More specifically, FIGS. 8A and 8B illustrate an iterative process 800 in which at least one spy 508 may be used to capture interactions and in which the contract generation function 62 may use the captured interactions to generate contracts 604.

As shown in FIG. 8A, code 802 and code 804 represent portions of software (namely JAVA code in this example) that can be executed in order to capture information about incoming and outgoing interactions involving a system under test 402. In this example, the code 802 and 804 can be used to record the interactions, which include information 806 shown in FIG. 8A. This information 806 specifically relates to HTTP requests/responses, although the information 806 may be related to asynchronous messages or other information. As shown in FIG. 8B, the code 802 and 804 can be used repeatedly with any number of interactions, and the resulting information 806 can be used to generate multiple contracts 808.

This particular example is illustrated with respect to a JAVA framework, where numerous application programming interface (API) calls may be made within the framework during a given time period. The techniques described above can be used to seamlessly convert any number of behavioral tests 114 into integration tests 116, where the integration tests 116 can be defined by artifacts 706 that include test doubles 704 and associated contracts 604. Using the artifacts 706, it is possible to (among other things) replay responses given matched requests in order to verify proper integration of software code.

Although FIGS. 8A and 8B illustrate one example of recording of interactions and generation of contracts during conversion between behavioral tests and integration tests for software testing, various changes may be made to FIGS. 8A and 8B. For example, the code and results shown in FIGS. 8A and 8B are for illustration and explanation only and do not limit the scope of this disclosure to any particular implementation or type(s) of results.

The following describes example embodiments of this disclosure that implement or relate to the automated conversion between behavioral tests and integration tests for software testing. However, other embodiments may be used in accordance with the teachings of this disclosure.

In a first embodiment, a method includes performing one or more behavioral tests of software code. The method also includes, during the one or more behavioral tests, recording interactions associated with the software code. The interactions include simulated incoming interactions to the software code and actual outgoing interactions from the software code. The method further includes converting the interactions into contracts, where each contract includes information defining how at least one interaction involving the software code occurs. In addition, the method includes generating one or more integration tests for the software code based on the contracts. The one or more behavioral tests are configured to test functional behaviors of the software code. The one or more integration tests are configured to test integration of the software code with at least one external component.

In a second embodiment, an apparatus includes at least one processing device configured to perform one or more behavioral tests of software code. The at least one processing device is also configured, during the one or more behavioral tests, to record interactions associated with the software code. The interactions include simulated incoming interactions to the software code and actual outgoing interactions from the software code. The at least one processing device is further configured to convert the interactions into contracts, where each contract includes information defining how at least one interaction involving the software code occurs. In addition, the at least one processing device is configured to generate one or more integration tests for the software code based on the contracts. The one or more behavioral tests are configured to test functional behaviors of the software code. The one or more integration tests are configured to test integration of the software code with at least one external component.

In a third embodiment, a non-transitory machine readable medium contains instructions that when executed cause at least one processor to perform one or more behavioral tests of software code. The non-transitory machine readable medium also contains instructions that when executed cause the at least one processor, during the one or more behavioral tests, to record interactions associated with the software code. The interactions include simulated incoming interactions to the software code and actual outgoing interactions from the software code. The non-transitory machine readable medium further contains instructions that when executed cause the at least one processor to convert the interactions into contracts, where each contract includes information defining how at least one interaction involving the software code occurs. In addition, the non-transitory machine readable medium contains instructions that when executed cause the at least one processor to generate one or more integration tests for the software code based on the contracts. The one or more behavioral tests are configured to test functional behaviors of the software code. The one or more integration tests are configured to test integration of the software code with at least one external component.

Any single one or any suitable combination of the following features may be used with the first, second, or third embodiment. The one or more integration tests may be generated by generating one or more test doubles configured to replay one or more interactions based on one or more of the contracts and packaging the one or more test doubles and the one or more contracts as one or more artifacts. The one or more behavioral tests may include multiple behavioral tests, and the one or more test doubles may be generated for a subset of the behavioral tests during generation of the integration tests (where at least one of the behavioral tests may be marked as not being used to generate the one or more test doubles). During the one or more behavioral tests, the functional behaviors of the software code may be tested in isolation from the at least one external component. The interactions associated with the software code may be recorded using at least one spy proxy, and the at least one spy proxy may be configured to record interactions between at least one controller associated with the software code and at least one simulated external component. Each contract may define how the at least one external component is able to make a request to the software code and what to expect in response to that request. The one or more behavioral tests and the one or more integration tests may be stored in a database. Integration testing of the at least one external component may be performed using the one or more integration tests stored in the database. A suite of behavioral tests may be converted into a suite of integration tests, and the suite of behavioral tests and the suite of integration tests may be stored in the database.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "software" includes one or more applications or programs and encompasses specialized code like firmware. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "consumer," "provider," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    performing one or more behavioral tests of software code;
    during the one or more behavioral tests, recording interactions associated with the software code, the interactions including simulated incoming interactions to the software code and actual outgoing interactions from the software code;

converting the interactions into contracts, each contract comprising information defining how at least one interaction involving the software code occurs; and
generating one or more integration tests for the software code based on the contracts;
wherein the one or more behavioral tests are configured to test functional behaviors of the software code; and
wherein the one or more integration tests are configured to test integration of the software code with at least one external component.

2. The method of claim 1, wherein generating the one or more integration tests comprises:
generating one or more test doubles configured to replay one or more interactions based on one or more of the contracts; and
packaging the one or more test doubles and the one or more contracts as one or more artifacts.

3. The method of claim 2, wherein:
the one or more behavioral tests comprise multiple behavioral tests; and
the one or more test doubles are generated for a subset of the behavioral tests during generation of the integration tests, at least one of the behavioral tests marked as not being used to generate the one or more test doubles.

4. The method of claim 1, wherein:
during the one or more behavioral tests, the functional behaviors of the software code are tested in isolation from the at least one external component; and
the interactions associated with the software code are recorded using at least one spy proxy, the at least one spy proxy recording interactions between at least one controller associated with the software code and at least one simulated external component.

5. The method of claim 1, wherein each contract defines how the at least one external component is able to make a request to the software code and what to expect in response to that request.

6. The method of claim 1, further comprising:
storing the one or more behavioral tests and the one or more integration tests in a database.

7. The method of claim 6, wherein integration testing of the at least one external component is performed using the one or more integration tests stored in the database.

8. An apparatus comprising:
at least one processing device configured to:
perform one or more behavioral tests of software code;
during the one or more behavioral tests, record interactions associated with the software code, the interactions including simulated incoming interactions to the software code and actual outgoing interactions from the software code;
convert the interactions into contracts, each contract comprising information defining how at least one interaction involving the software code occurs; and
generate one or more integration tests for the software code based on the contracts;
wherein the one or more behavioral tests are configured to test functional behaviors of the software code; and
wherein the one or more integration tests are configured to test integration of the software code with at least one external component.

9. The apparatus of claim 8, wherein, to generate the one or more integration tests, the at least one processing device is configured to:
generate one or more test doubles configured to replay one or more interactions based on one or more of the contracts; and
package the one or more test doubles and the one or more contracts as one or more artifacts.

10. The apparatus of claim 9, wherein:
the one or more behavioral tests comprise multiple behavioral tests; and
the one or more test doubles are generated for a subset of the behavioral tests during generation of the integration tests, at least one of the behavioral tests marked as not being used to generate the one or more test doubles.

11. The apparatus of claim 8, wherein:
during the one or more behavioral tests, the at least one processing device is configured to test the functional behaviors of the software code in isolation from the at least one external component; and
the at least one processing device is configured to record the interactions associated with the software code using at least one spy proxy, the at least one spy proxy configured to record interactions between at least one controller associated with the software code and at least one simulated external component.

12. The apparatus of claim 8, wherein each contract defines how the at least one external component is able to make a request to the software code and what to expect in response to that request.

13. The apparatus of claim 8, wherein the at least one processing device is further configured to store the one or more behavioral tests and the one or more integration tests in a database.

14. The apparatus of claim 13, wherein the at least one processing device is configured to convert a suite of behavioral tests into a suite of integration tests and to store the suite of behavioral tests and the suite of integration tests in the database.

15. A non-transitory machine readable medium containing instructions that when executed cause at least one processor to:
perform one or more behavioral tests of software code;
during the one or more behavioral tests, record interactions associated with the software code, the interactions including simulated incoming interactions to the software code and actual outgoing interactions from the software code;
convert the interactions into contracts, each contract comprising information defining how at least one interaction involving the software code occurs; and
generate one or more integration tests for the software code based on the contracts;
wherein the one or more behavioral tests are configured to test functional behaviors of the software code; and
wherein the one or more integration tests are configured to test integration of the software code with at least one external component.

16. The non-transitory machine readable medium of claim 15, wherein the instructions that when executed cause the at least one processor to generate the one or more integration tests comprise:
instructions that when executed cause the at least one processor to:
generate one or more test doubles configured to replay one or more interactions based on one or more of the contracts; and
package the one or more test doubles and the one or more contracts as one or more artifacts.

17. The non-transitory machine readable medium of claim 16, wherein:
the one or more behavioral tests comprise multiple behavioral tests; and the one or more test doubles are generated for a subset of the behavioral tests during generation of the integration tests, at least one of the behavioral tests marked as not being used to generate the one or more test doubles.

18. The non-transitory machine readable medium of claim 15, wherein:
the instructions when executed cause the at least one processor, during the one or more behavioral tests, to test the functional behaviors of the software code in isolation; and
the instructions when executed cause the at least one processor to record the interactions associated with the software code using at least one spy proxy, the at least one spy proxy configured to record interactions between at least one controller associated with the software code and at least one simulated external component.

19. The non-transitory machine readable medium of claim 15, wherein each contract defines how the at least one external component is able to make a request to the software code and what to expect in response to that request.

20. The non-transitory machine readable medium of claim 15, further containing instructions that when executed cause the at least one processor to store the one or more behavioral tests and the one or more integration tests in a database.

* * * * *